B. DARLINGTON & J. M. CALL.
GAS MACHINE.
APPLICATION FILED JAN. 20, 1910.
985,662.
Patented Feb. 28, 1911.
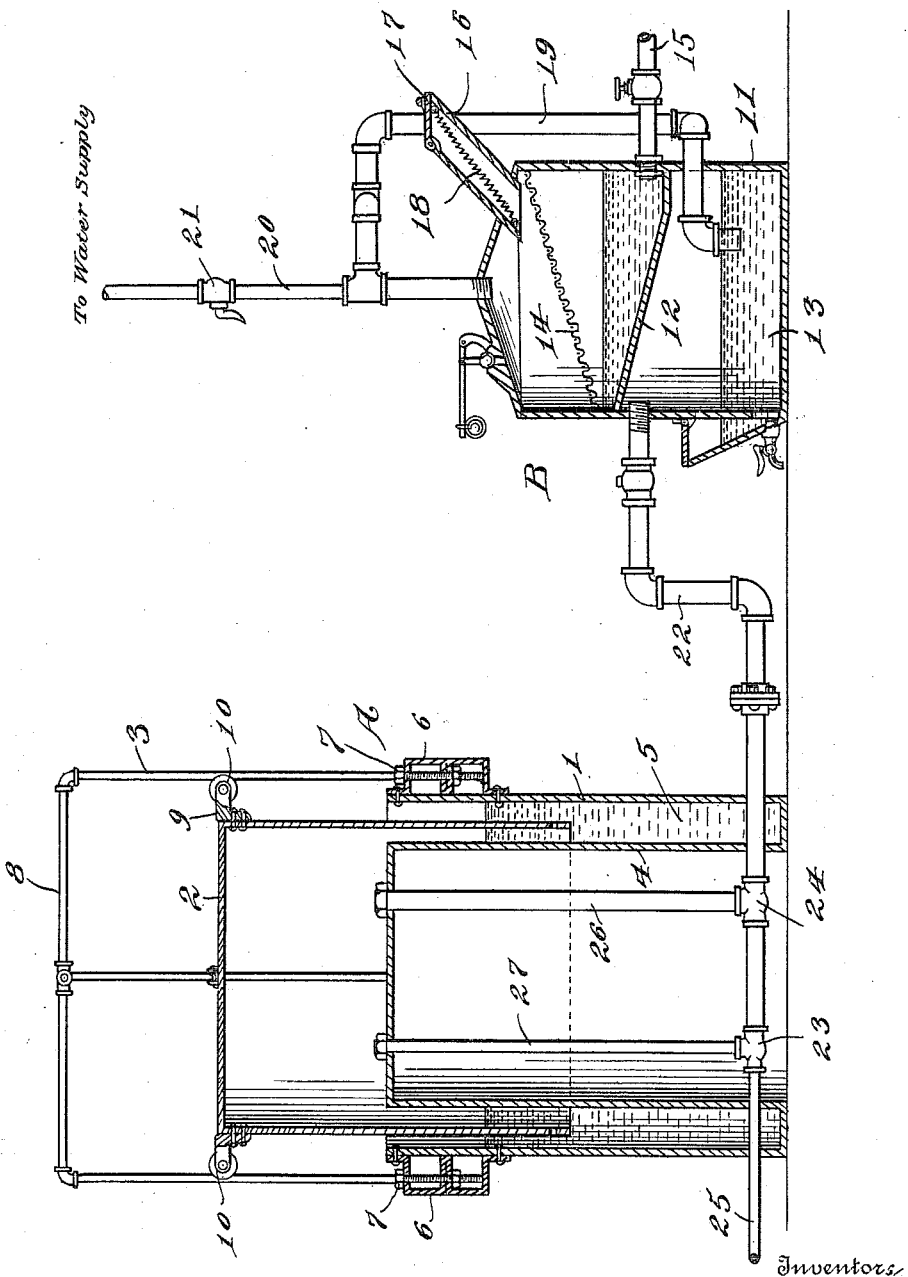
Witnesses
H. H. Lybrand
V. B. Hillyard.
Inventors
Benjamin Darlington &
Joseph M. Call
By Victor J. Evans
Attorney

UNITED STATES PATENT OFFICE.

BENJAMIN DARLINGTON AND JOSEPH M. CALL, OF VAUGHAN, WEST VIRGINIA; SAID CALL ASSIGNOR TO SAID DARLINGTON.

GAS-MACHINE.

985,662.  Specification of Letters Patent.   Patented Feb. 28, 1911.

Application filed January 20, 1910. Serial No. 539,032.

*To all whom it may concern:*

Be it known that we, BENJAMIN DARLINGTON and JOSEPH M. CALL, citizens of the United States, residing at Vaughan, in the county of Nicholas and State of West Virginia, have invented new and useful Improvements in Gas-Machines, of which the following is a specification.

The present invention provides a machine for generating gas for illuminating dwellings and other structures and employing calcium carbid as the agent evolving the illuminating gas in connection with water, the latter being supplied in small quantity and the surplus gas being received in a gasometer of such construction as to provide a liquid seal between the gas bell and tank, enabling a small amount of liquid being used so that in cold weather an antifreezing liquid may be provided at a comparatively small cost.

The invention contemplates a generator of peculiar formation and a coöperating gasometer involving novel structural features, the two being connected with each other and with the service pipe so that the gas may be used directly from the generator or from the gasometer and whereby gas generated in excess of consumption is stored in the gasometer and prevented from wasting.

The invention consists of the novel features, details of construction and combination of parts, which hereinafter will be more particularly set forth, illustrated in the accompanying drawing, and pointed out in the appended claims.

The drawing, which is a sectional view, illustrates a gasometer A and a generator B embodying the invention. The gasometer consists of a tank 1 and a bell 2, the latter being mounted to rise and fall and directed in its movements and retained in place by suitable guides 3, which are attached at their lower ends to the sides of the tank 1. Within the tank 1 is arranged a shell 4, the latter being concentric with the tank 1 and of less diameter so as to provide an annular space 5 between the vertical walls of the shell and the tank. The shell 4 is open at its lower end and closed at its upper end and is secured at its lower end to the bottom of the tank 1 in a manner to provide a watertight joint. The middle portion of the bottom of the tank 1 is cut away corresponding to the diameter of the shell 4. The shell 4 is about equal in height to the depth of the tank 1 and forms in effect a hollow core, which serves to displace the liquid which would otherwise be required to entirely fill the lower portion of the tank 1 to provide a liquid seal between said tank and gas bell 2, with the result that a comparatively small amount of liquid only is required to be used to form an effective seal between the gas bell and tank, thereby enabling an antifreezing liquid being employed in cold weather, such as a combination of water and alcohol, or water and glycerin, or a combination of water, alcohol and glycerin. The gas bell 2 is of a diameter greater than the shell 4 and less than the tank 1 and dips into a liquid contained in the space 5, so as to form a seal to prevent the escape of the gas collected in the bell.

Brackets 6 are provided at the sides of the tank 1 near the upper end thereof and receive the lower ends of the vertical guides 3, the latter passing through openings in horizontal portions of the brackets and having their lower ends threaded to receive nuts 7, by means of which the said guides are retained in place. Cross pieces 8 connect the upper ends of the vertical guides 3, said cross pieces being joined at a middle point. The guides 3 and cross pieces 8 preferably consist of lengths of tubing, which are connected by suitable fittings, a fourway fitting being provided at a central point to receive short lengths of pipe corresponding to the cross pieces 8. The gas bell 2 is provided with brackets 9 supplied with grooved wheels 10, which are arranged to travel upon the vertical guides 3 and retain the gas bell in central position and direct the same in its vertical movements.

The generator consists of a tank 11, which is divided by means of a partition 12 into upper and lower compartments, the lower compartment receiving a quantity of water 13 for washing and purifying the gas and the upper compartment being designed to receive the gas forming agent or agents, such as calcium carbid and water. The partition 12 inclines to the horizontal, whereby the lower compartment is higher at one side than at the other and whereby the upper compartment is lower at one side than at the opposite side. An inclined screen 14 is placed in the upper compartment and forms a rest for the calcium carbid. The space in the upper compartment below the screen 14 serves to receive the residue, the latter being drawn off through a drain pipe 15, which communicates with said upper compartment at the lowest point, thereby insuring thorough drainage thereof. A chute 16 connects with the top of the generating tank 11 and serves as convenient means for supplying the gas producing agent to the screen 14. The lower end of the chute 16 terminates at about the top or highest point of the screen 14. The upper end of the chute 16 is closed by means of a door 17, which latter is held in closed position by means of a contractile spring 18. It is to be understood that the generating tank 11 will be provided with a safety valve of any type, so as to afford a relief for dangerous internal pressure due to an overproduction of gas or from any other cause. A pipe 19 connects the gas generating compartment with the purifying or washing compartment, the lower end of the pipe 19 extending into the lower or purifying compartment and dipping into the water contained therein, whereby the gas generated is caused to pass through the water of the purifying compartment before entering the service pipe. A small pipe 20 connects with the vertical part of the pipe 19 leading from the top of the generating tank 11 and is provided with a valve 21 for regulating the supply of water to the carbid or other gas producing agent contained in the generator. The pipe 20 extends to any suitable source of water supply.

A pipe 22 connects the generator with the gasometer, said pipe communicating with the highest point of the purifying compartment and passing through the lower portions of the tank 1 and shell 4 and provided with T fittings 23 and 24. One member of the T fitting 23 is reduced and the service pipe 25 is coupled thereto. A vertical pipe 26 connects with the T fitting 24 and extends through the shell 4 and through the top thereof so as to supply any surplus gas to the gas bell 2. A pipe 27 extends vertically through the shell 4 and is connected at its upper end with the top of said shell, said pipe being connected at its lower end with the fitting 23. The pipe 27 is of less diameter than the pipe 26 and is intended to carry off gas from the gas bell to the service pipe 25 in the event of gas being drawn from the gasometer.

The machine is of such construction as to be used for illuminating dwellings, where a general gas plant is not provided, and is portable and of such construction as not to necessitate the sinking of the gasometer or the housing of the same to prevent freezing of the liquid seal in cold weather. Moreover, by reason of the comparatively small amount of liquid required to be used to form an effective seal between the gas bell and tank 1 an antifreezing solution may be advantageously and economically employed.

While it is preferred to locate the door 17 at the upper end of the chute 16, it is to be understood that the same may be conveniently positioned in the length of the chute, as may be found most advantageous.

Having thus described the invention what is claimed as new, is:—

1. A generator comprising a tank embodying upper and lower compartments, a screen arranged in the upper compartment for supporting the gas producing agent, a chute leading into the upper compartment above the screen for directing the gas producing agent thereto, a self-closing door fitted to said chute, a pipe for supplying water to the gas producing agent contained in the upper portion of the upper compartment, means for conveying the gas from the upper compartment into the lower portion of the lower compartment, in which latter is placed a quantity of water, and means for carrying off the purified gas from the upper portion of the said lower compartment.

2. A generator comprising a tank subdivided by a partition inclined to the horizontal to form upper and lower compartments, an inclined screen in the upper compartment, a chute leading into the upper portion of the upper compartment and provided with a spring closed door, a drain pipe connected with the lower portion of the upper compartment, and a pipe connecting the upper portion of the upper compartment with the lower portion of the lower compartment and dipping into the water contained in said lower compartment to cause the gas generated to pass therethrough in the process of purifying.

In testimony whereof we affix our signatures in presence of two witnesses.

BENJAMIN DARLINGTON.
JOSEPH M. CALL.

Witnesses:
 W. E. BACKUS,
 NAYLOR HAYES.

---

Copies of this patent may be obtained for five cents each, by addressing the "Commissioner of Patents, Washington, D. C."